United States Patent
Cai et al.

(10) Patent No.: US 9,420,545 B2
(45) Date of Patent: Aug. 16, 2016

(54) POWER CONTROL METHOD, POWER CONTROL SYSTEM AND RELATED DEVICE

(71) Applicant: HUAWEI TECHNOLOGIES CO., LTD., Shenzhen, Guangdong (CN)

(72) Inventors: Hua Cai, Shanghai (CN); Shujuan Lv, Shanghai (CN); Jianyou Lin, Shenzhen (CN); Nianwei Cao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/499,698

(22) Filed: Sep. 29, 2014

(65) Prior Publication Data

US 2015/0018032 A1    Jan. 15, 2015

Related U.S. Application Data

(63) Continuation of application No. PCT/CN2013/072425, filed on Mar. 12, 2013.

(30) Foreign Application Priority Data

Mar. 29, 2012    (CN) .......................... 2012 1 0088102

(51) Int. Cl.
*H04B 1/00*     (2006.01)
*H04B 17/00*    (2015.01)
(Continued)

(52) U.S. Cl.
CPC ............ *H04W 52/228* (2013.01); *H04W 24/08* (2013.01); *H04W 52/143* (2013.01);
(Continued)

(58) Field of Classification Search
CPC .................................................. H04W 52/228

USPC .......................................................... 455/522
See application file for complete search history.

(56) References Cited

U.S. PATENT DOCUMENTS

| 8,374,151 | B2 * | 2/2013 | Ke ...................... H04W 76/046 370/331 |
| 2005/0277419 | A1 * | 12/2005 | Takano .................. H04W 52/40 455/442 |

(Continued)

FOREIGN PATENT DOCUMENTS

| CN | 101136666 A * | 3/2008 | ............. H04B 7/005 |
| CN | 101243617 A | 8/2008 | |

(Continued)

OTHER PUBLICATIONS

PCT International Search Report issued on Jun. 27, 2013 in corresponding International Patent Application No. PCT/CN2013/072425.

(Continued)

*Primary Examiner* — Tilahun B Gesesse
(74) *Attorney, Agent, or Firm* — Staas & Halsey LLP

(57) ABSTRACT

The present invention discloses a power control method, a power control system and a related device. The method includes: monitoring a downlink data sending condition of a dedicated physical data channel (DPDCH), and if no downlink data is sent on the DPDCH, determining to decrease downlink transmit power of a DPCH, or if downlink data is sent on the DPDCH, determining to increase or maintain downlink transmit power of a DPCH. The present invention can reduce the downlink transmit power of the DPCH and promote experience of other users on a precondition of ensuring system performance.

9 Claims, 4 Drawing Sheets

(51) Int. Cl.
*H04B 7/00* (2006.01)
*H04W 52/22* (2009.01)
*H04W 52/14* (2009.01)
*H04W 52/16* (2009.01)
*H04W 52/26* (2009.01)
*H04W 24/08* (2009.01)
*H04W 52/28* (2009.01)
*H04W 52/32* (2009.01)

(52) U.S. Cl.
CPC ............ *H04W52/16* (2013.01); *H04W 52/267* (2013.01); *H04W 52/287* (2013.01); *H04W 52/325* (2013.01); *Y02B 60/50* (2013.01)

(56) References Cited

U.S. PATENT DOCUMENTS

2007/0191047 A1 8/2007 Catreux-Erceg et al.
2014/0106762 A1 4/2014 Baker

FOREIGN PATENT DOCUMENTS

| CN | 102647778 A | 8/2012 |
| EP | 1 389 836 A1 | 2/2004 |
| WO | WO 00/62456 | 10/2000 |

OTHER PUBLICATIONS

"3rd Generation Partnership Project; Technical Specification Group Radio Access Network; Physical channels and mapping of transport channels onto physical channels (FDD) (Release 11)", 3GPP TS 25.211 V11.0.0, Dec. 2011, pp. 1-60.

Extended European Search Report mailed Feb. 12, 2015 for corresponding European Patent Application No. 13769592.0.

Ericsson, "F-DPCH Downlink Power Control," 3GPP TSG RAN WG1 Meeting # 40, Feb. 2005.

International Search Report mailed Jun. 27, 2013, in corresponding International Patent Application No. PCT/CN2013/072425.

* cited by examiner

POWER CONTROL METHOD, POWER CONTROL SYSTEM AND RELATED DEVICE

CROSS-REFERENCE TO RELATED APPLICATIONS

This application is a continuation of International Application No. PCT/CN2013/072425, filed on Mar. 12, 2013, which claims priority to Chinese Patent Application No. 201210088102.4, filed on Mar. 29, 2012, both of which are hereby incorporated by reference in their entireties.

TECHNICAL FIELD

The present invention relates to power control technologies in a mobile communication system, and in particular, to a power control method, a power control system and a related device.

BACKGROUND

When a downlink service of a packet switching (PS, Packet Switching) domain is borne on high speed downlink packet access (high speed downlink packet access, hereinafter referred to as HSDPA), for each HSDPA user, an accompanying dedicated physical channel (Dedicated Physical Channel, hereinafter referred to as DPCH) needs to be allocated, and is used for inner loop power control and a signaling radio bearer (Signal Radio Bearer, hereinafter referred to as SRB).

The DPCH includes a dedicated physical data channel (Dedicated Physical Data Channel, hereinafter referred to as DPDCH) and a dedicated physical control channel (Dedicated Physical Control Channel, hereinafter referred to as DPCCH). The two channels are delivered after being multiplexed together. FIG. 1 shows a frame format of a DPCH (excerpted from the 3GPP 25.211 protocol), where the DPCH further includes other information domains besides a transmit power control (Transmit Power Control, hereinafter referred to as TPC) domain.

When a DPCH is initially established, a base station controller sends establishment signaling to a base station, where the establishment signaling carries initial transmit power, maximum downlink transmit power and minimum downlink transmit power of a DPDCH, and also carries an output power offset value of a DPCCH relative to the DPDCH. The base station adjusts transmit power on the DPDCH by using an inner loop power control algorithm, and limits its final output power to be between the maximum downlink transmit power and the minimum downlink transmit power. Though the power control algorithm can reduce power consumption on the DPCH, the power consumption of the DPCH still takes up a very large part of total downlink power consumption. Through analytic statistics on data of an existing network, it is found that consumed power of each DPCH takes up about 0.7% of total downlink transmit power. In a scenario of an intelligent terminal, the number of online users is very large. Though consumed power of a DPCH of each user is not high, DPCHs of all the users consume a large part of downlink power resources. Assuming that 50 HSDPA users exist, about 35% of downlink power needs to be consumed. A common channel needs to consume about 30% of the downlink power, and adaptive multi-rate coding (Adaptive Multi-Rate and Adaptive Multi-Rate Wideband, hereinafter referred to as AMR) speech further needs to consume about 20% of the downlink power, so a little power, only about 10%, is available to an HSDPA data channel. It can be seen that, the consumed power of the DPCHs of the HSDPA users is far greater than the available power of the HSDPA data channel.

Therefore, how to solve a power consumption problem of the DPCH becomes one of current main research and development directions.

SUMMARY

Multiple aspects of the present invention provide a power control method, a power control system and a related device, which can reduce downlink transmit power of a DPCH and improve experience of other users.

One aspect of the present invention provides a power control method, including: monitoring a downlink data sending condition of a dedicated physical data channel (DPDCH); and if no downlink data is sent on the DPDCH, determining to decrease downlink transmit power of a DPCH, or if downlink data is sent on the DPDCH, determining to increase or maintain downlink transmit power of a DPCH.

Another aspect of the present invention provides a power control apparatus, including: a monitoring unit, configured to monitor a downlink data sending condition of a DPDCH; a determining unit, configured to, when the monitoring unit monitors that no downlink data is sent on the DPDCH, determine to decrease downlink transmit power of a DPCH, and when the monitoring unit monitors that downlink data is sent on the DPDCH, determine to increase or maintain the downlink transmit power of the DPCH.

Another aspect of the present invention provides a power control system, including: a power control apparatus, configured to monitor a downlink data sending condition of a DPDCH, when no downlink data is sent on the DPDCH, determine to decrease downlink transmit power of a DPCH, and when downlink data is sent on the DPDCH, determine to increase or maintain the downlink transmit power of the DPCH; and a base station, configured to adjust power configuration information according to an adjustment direction determined by the power control apparatus, and adjust the downlink transmit power of the DPCH according to the adjusted power configuration information.

Another aspect of the present invention provides a power control system, including: a power control apparatus, configured to: monitor a downlink data sending condition of a DPDCH, when no downlink data is sent on the DPDCH, determine to decrease downlink transmit power of a DPCH, when downlink data is sent on the DPDCH, determine to increase or maintain the downlink transmit power of the DPCH, and adjust power configuration information; and a base station, configured to adjust the downlink transmit power of the DPCH according to the adjusted power configuration information in the power control apparatus.

Based on the foregoing technical solutions, downlink transmit power of a DPCH may be effectively reduced, and experience of other users may be improved.

BRIEF DESCRIPTION OF DRAWINGS

To illustrate the technical solutions according to the embodiments of the present invention more clearly, accompanying drawings required for describing the embodiments of the present invention are introduced briefly in the following. Apparently, the accompanying drawings described in the following are only some embodiments of the present invention, and persons of ordinary skill in the art may further obtain other drawings according to these accompanying drawings without creative efforts.

DESCRIPTION OF EMBODIMENTS

Figure 1:
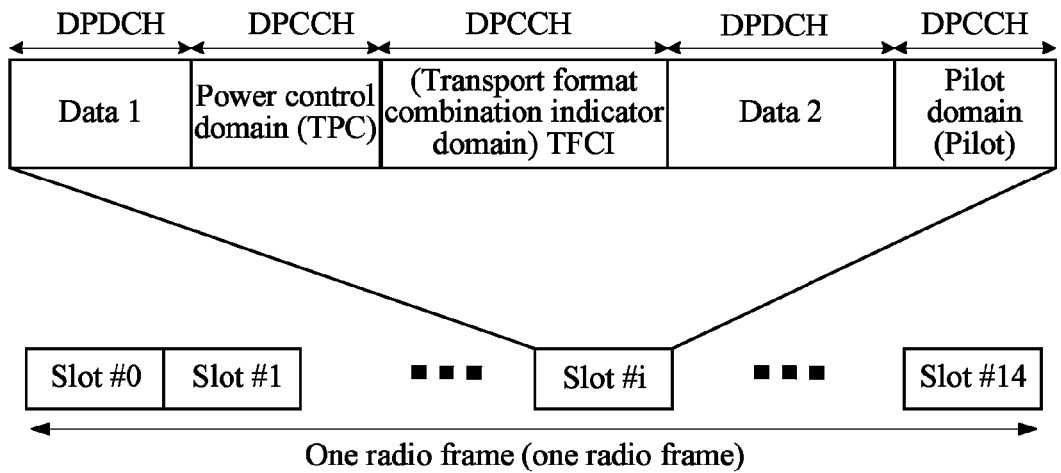
FIG. 1 is a schematic diagram of a frame format of a DPCH in the prior art.

In the following description, for the purpose of illustration rather than for limitation, specific details such as a particular system structure, interface, and technology are presented, so as to facilitate thorough understanding of the present invention. However, persons of skill in the art should understand that, the present invention may also be implemented in other embodiments without these specific details. In other situations, detailed description about a well-known apparatus, circuit and method are omitted, so as to avoid unnecessary details that interfere with the description of the present invention.

The technology described in this specification may be used in various communication systems, for example, current 2G and 3G communication systems and a next generation communication system, for example, a global system for mobile communications (GSM, Global System for Mobile communications), a code division multiple access (CDMA, Code Division Multiple Access) system, a time division multiple access (TDMA, Time Division Multiple Access) system, wideband code division multiple access (WCDMA, Wideband Code Division Multiple Access Wireless), a frequency division multiple access (FDMA, Frequency Division Multiple Addressing) system, an orthogonal frequency-division multiple access (OFDMA, Orthogonal Frequency-Division Multiple Access) system, a single-carrier FDMA (SC-FDMA) system, a general packet radio service (GPRS, General Packet Radio Service) system, a long term evolution (LTE, Long Term Evolution) system, and other communication systems of this type.

Various aspects are described in this specification with reference to a base station and/or a base station controller.

A base station (for example, an access point) may refer to a device communicating with a wireless terminal through one or multiple sectors on an air interface in an access network. The base station may be used to perform interconversion on a received air frame and IP packet, and used as a router between the wireless terminal and another part of the access network, where the another part of the access network may include an Internet protocol (IP) network. The base station may also coordinate attribute management for the air interface. For example, the base station may be a base station (BTS, Base Transceiver Station) in the GSM or the CDMA, may also be a base station (NodeB) in the WCDMA, and may also be an evolutional base station (NodeB or eNB or e-NodeB, evolutional Node B) in the LTE, which is not limited in the present invention.

A base station controller may be a base station controller (BSC, base station controller) in the GSM or the CDMA, and may also be a radio network controller (RNC, Radio Network Controller) in the WCDMA, which is not limited in the present invention.

Besides, the terms "system" and "network" in this specification are usually used interchangeably in this specification. The term "and/or" in this specification is merely an association relationship for describing associated objects, and indicates that three relationships may exist. For example, A and/or B may indicate three situations: A exists individually, A and B exist at the same time, and B exists individually. Besides, in this specification, the character "/" generally indicates an "or" relationship of the associated objects.

For convenience of description, in this specification, various aspects are described with reference to a NodeB and/or an RNC.

Figure 2:
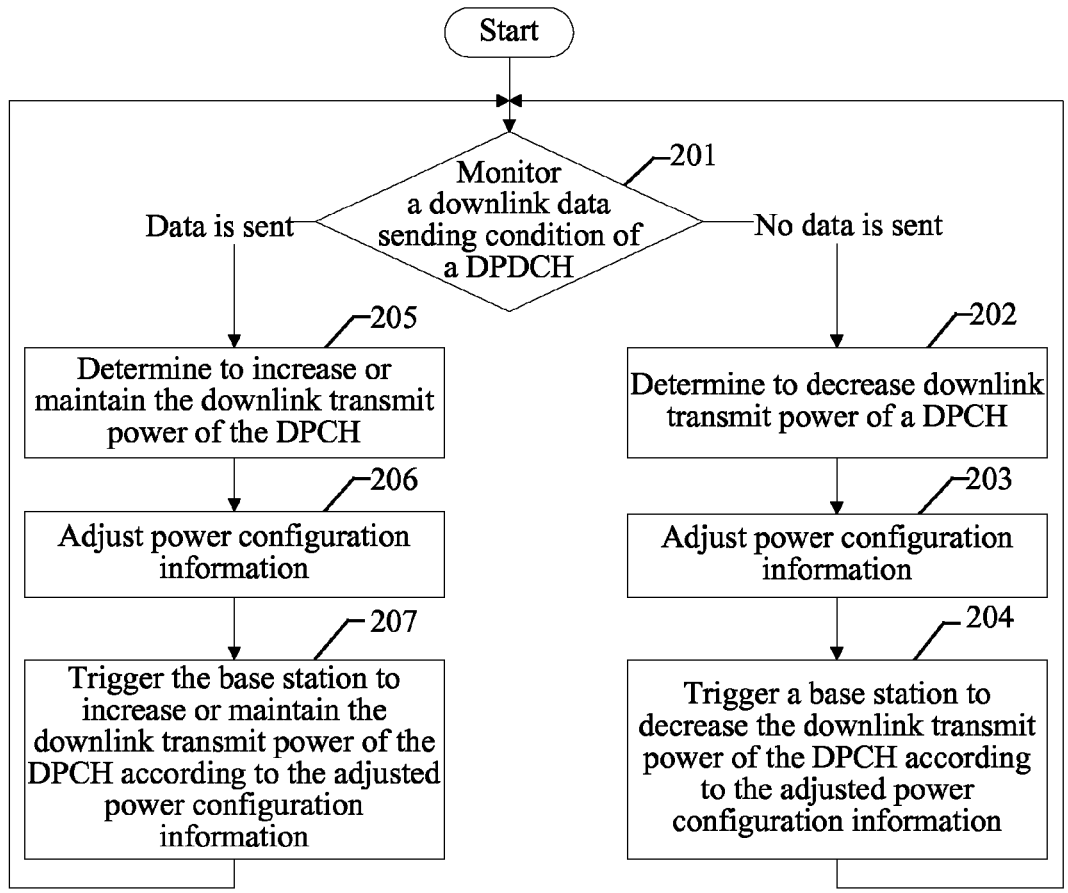
FIG. 2 is a schematic flow chart of an embodiment of a power control method according to the present invention.

Referring to FIG. 2, an embodiment of a power control method of the present invention may be implemented by a NodeB or an RNC.

201: Monitor a downlink data sending condition of a DPDCH.

Downlink data of the DPDCH includes any data sent in a downlink of the DPDCH.

In step 201, the monitoring the downlink data sending condition of the DPDCH may be triggered periodically by a timer, may also be triggered by an event, and may also be triggered by a combination of the two. The triggering event may be sending downlink data on the DPDCH, and may also be coding time, which is not limited in the embodiment of the present invention.

When it is monitored that no downlink data is sent on the DPDCH, step 202 is performed; and when it is monitored that downlink data is sent on the DPDCH, step 205 is performed.

202: Determine to decrease downlink transmit power of a DPCH.

The DPCH includes a DPDCH and a DPCCH, so the downlink transmit power of the DPCH can be adjusted by adjusting downlink transmit power of the DPDCH and/or downlink transmit power of the DPCCH.

The downlink transmit power of the DPDCH is configured and limited by a power configuration parameter sent by an RNC and includes an initial downlink transmit power value of the DPDCH, a maximum downlink transmit power value of the DPDCH and a minimum downlink transmit power value of the DPDCH.

The maximum downlink transmit power value of the DPDCH is an upper limit value of actual downlink transmit power of the DPDCH; the initial downlink transmit power value of the DPDCH is a downlink transmit power value of the DPDCH during channel establishment or reconfiguration; and the minimum downlink transmit power value of the DPDCH is a lower limit value of actual downlink transmit power of the DPDCH.

The downlink transmit power of the DPCCH is limited by a DPCCH power offset configuration parameter sent by the RNC, where a power offset (Power Offset, hereinafter referred to as PO) of the DPCCH is an offset value between the downlink transmit power of the DPCCH and the downlink transmit power of the DPDCH. The smaller a PO value is, the smaller the downlink transmit power of the DPCCH is; the larger the PO value is, the larger the downlink transmit power of the DPCCH is.

When the DPCH is initially established or reconfigured, the RNC carries, in establishment or reconfiguration signaling, a DPDCH power configuration parameter (see Table 1) and a DPCCH power offset parameter (see Table 2) to a NodeB. The power offset of the DPCCH includes power offsets of a transport format combination indicator (Transport Format Combination Indicator, referred to as TFCI) domain, a power control (Transmit Power Control, referred to as TPC) domain and a pilot (Pilot) domain.

TABLE 1

DPDCH power configuration parameter

| | | | |
|---|---|---|---|
| Initial downlink transmit power (Initial DL transmission power) | Integer (−350 ... 150); range (−35 ... 15 dB); unit: 0.1 dB | 2 | Initial downlink transmit power value (relative to pilot configuration power) |
| Maximum downlink transmit power (Maximum DL power) | Integer (−350 ... 150); range (−35 ... 15 dB); unit: 0.1 dB | 2 | Maximum downlink transmit power value (relative to pilot configuration power) |
| Minimum downlink transmit power (Minimum DL power) | Integer (−350 ... 150); range (−35 ... 15 dB); unit: 0.1 dB | 2 | Minimum downlink transmit power value (relative to pilot configuration power) |

TABLE 2

DPCCH power offset configuration parameter

| | | | |
|---|---|---|---|
| Power offset 1 (PO1) | Integer (0~24) | 1 | Power offset of a transport format combination indicator domain (TFCI); unit: 0.25 Db; range: 0-6 dB |
| Power offset 2 (PO2) | Integer (0~24) | 1 | Power offset of a power control domain (TPC); unit: 0.25 Db; range: 0-6 dB |
| Power offset 3 (PO3) | Integer (0~24) | 1 | Pilot (Pilot) power offset; unit: 0.25 Db; range: 0-6 dB |

To sum up, the downlink transmit power of the DPCH may be decreased by decreasing at least one piece of the following power configuration information, including: the maximum downlink transmit power value of the DPDCH, the initial downlink transmit power value of the DPDCH and the power offset value of the DPCCH.

Because the power configuration information needs to be configured for the NodeB, to initialize and/or limit the downlink transmit power of the DPCH, besides being performed by the NodeB triggered by sending, by the RNC, the establishment or reconfiguration signaling or a newly added message, modification of the power configuration information may also be triggered by the NodeB.

203: Adjust power configuration information.

The power configuration information includes at least one of the maximum downlink transmit power value of the DPDCH, the initial downlink transmit power value of the DPDCH and the power offset value of the DPCCH.

At least one of the following three manners may be adopted to adjust the power configuration information.

Manner 1: Decrease the maximum downlink transmit power value of the DPDCH.

Two methods A1 and A2 may be adopted to decrease the maximum downlink transmit power value of the DPDCH.

Method A1: On the basis of the currently configured maximum downlink transmit power value of the DPDCH, lower the currently configured maximum downlink transmit power of the DPDCH, where an adjustment value is an adjustment range of the maximum downlink transmit power of the DPDCH.

Method A2: On the basis of the downlink transmit power of the DPCH, lower the downlink transmit power of the DPDCH, where an adjustment value is an adjustment range of the maximum downlink transmit power of the DPDCH.

The downlink transmit power of the DPCH may be obtained by parsing a measurement report reported by a UE.

In Methods A1 and A2, the adjustment range of the maximum downlink transmit power of the DPDCH may be configured by an operation and maintenance station, and may also be preset in the RNC or the NodeB.

Methods A1 and A2 are illustrated as follows.

The adjustment range of the maximum downlink transmit power of the DPDCH is $P_{MAXOFFSET}$ (for example, 30; unit: 0.1 db); and the maximum downlink transmit power value of the DPDCH in a current configuration parameter is $P_{MAXCURRENT}$ (for example, −100; unit: 0.1 db). When downlink data is sent on the DPDCH, the downlink transmit power of the DPCH is $P_{OUT}$ (for example, −200, unit: 0.1 dB, relative to the pilot configuration power), so when no downlink data is sent on the DPDCH, the adjusted maximum downlink transmit power value $P_{MAX}$ of the DPDCH obtained by adopting Method A1 is:

$$P_{MAX}=P_{MAXCURRENT}-P_{MAXOFFSET} \qquad \text{Formula (1)}$$

For example, $P_{MAX}=-100-30=-130$ is obtained according to Formula (1).

The adjusted maximum downlink transmit power value $P_{MAX}$ of the DPDCH obtained by adopting Method A2 is:

$$P_{MAX}=P_{OUT}-P_{MAXOFFSET} \qquad \text{Formula (2)}$$

For example, $P_{MAX}=-200-30=-230$ is obtained according to Formula (2).

Manner 2: Decrease the initial downlink transmit power value of the DPDCH.

Two methods B1 and B2 may be adopted to decrease the initial downlink transmit power value of the DPDCH.

Method B1: On the basis of currently configured initial downlink transmit power value of the DPDCH, lower the currently configured initial downlink transmit power value of the DPDCH, where an adjustment value is an adjustment range of the initial downlink transmit power of the DPDCH.

Method B2: On the basis of the downlink transmit power value of the DPCH, lower the downlink transmit power value of the DPDCH, where an adjustment value is an adjustment range of the initial downlink transmit power of the DPDCH.

In Methods B1 and B2, the adjustment range of the initial downlink transmit power of the DPDCH may be configured by an operation and maintenance station, and may also be preset in the RNC or the NodeB.

Methods B1 and B2 are illustrated as follows.

The adjustment range of the initial downlink transmit power of the DPDCH is $P_{INITOFFSET}$ (for example, 30; unit: 0.1 db); and the initial downlink transmit power value of the DPDCH in a current configuration parameter is $P_{INITCURRENT}$ (for example, −100; unit: 0.1 db). When downlink data is sent on the DPDCH, the downlink transmit power of the DPCH is $P_{OUT}$ (for example, −200, unit: 0.1 dB, relative to pilot configuration power), so when no downlink data is sent on the DPDCH, the adjusted initial downlink transmit power value $P_{INIT}$ of the DPDCH obtained by adopting Method B1 is:

$$P_{INIT}=P_{INITCURRENT}-P_{INITOFFSET} \qquad \text{Formula (3)}$$

For example, $P_{INIT}=-100-30=-130$ is obtained according to Formula (3).

The adjusted initial downlink transmit power value $P_{INIT}$ of the DPDCH obtained by adopting Method B2 is:

$$P_{INIT}=P_{OUT}-P_{INITOFFSET} \qquad \text{Formula (4)}$$

For example, $P_{INIT}=-200-30=-230$ is obtained according to Formula (4).

Manner 3: Decrease the power offset of the DPCCH.

The decreasing the power offset of the DPCCH may be decreasing a power offset of any one of the TFCI domain, the TPC domain and the Pilot domain, and may also be decreasing a combination of power offsets of these several domains.

In Manner 3, the decreasing the power offset of the DPCCH refers to, on the basis of the currently configured power offset of the DPCCH, lowering the currently configured power offset of the DPCCH, where an adjustment value is an adjustment range of the power offset of the DPCCH. The adjustment range of the power offset of the DPCCH may be configured by an operation and maintenance station, and may also be preset in the RNC or the NodeB.

It should be pointed out that, when at least one of Manners 1 and 2 is adopted to adjust the power configuration information in step 203, and when it is monitored in step 201 that no downlink data is sent on the DPDCH in consecutive monitoring periods, the downlink transmit power of the DPCH may be decreased continuously, that is, the power configuration information in Manner 1 and/or 2 is decreased in the consecutive monitoring periods as long as the adjusted power configuration information is not less than the minimum downlink transmit power value of the DPDCH. Method A1 in Manner 1 is illustrated as follows, where $P_{MAXOFFSET}$ is the adjustment range of the maximum downlink transmit power of the DPDCH.

For example, in the following three consecutive monitoring periods, assuming that in a first monitoring period, it is monitored that downlink data is sent on the DPDCH, in this case, the maximum downlink transmit power value $P_{MAX}$ of the DPDCH is $P_{MAX1}$; in a second monitoring period, it is monitored that no downlink data is sent on the DPDCH, a temporary variable $P_{MAX2}$ is $(P_{MAX1}-P_{MAXOFFSET})$, whether $P_{MAX2}$ is less than the minimum downlink transmit power value of the DPDCH is determined, if yes, $P_{MAX}$ is maintained unchanged and is still $P_{MAX1}$, and if not, the maximum downlink transmit power value $P_{MAX}$ of the DPDCH is adjusted to be $P_{MAX2}$; and in a third monitoring period, it is monitored that still no downlink data is sent on the DPCH, a temporary variable $P_{MAX3}$ is $(P_{MAX2}-P_{MAXOFFSET})$, whether $P_{MAX3}$ is less than the minimum downlink transmit power value of the DPDCH is determined, if yes, $P_{MAX}$ is maintained unchanged and is still $P_{MAX2}$, and if not, the maximum downlink transmit power value $P_{MAX}$ of the DPDCH is adjusted to be $P_{MAX3}$.

204: Trigger a base station to decrease the downlink transmit power of the DPCH according to the adjusted power configuration information.

If the monitoring and adjusting are implemented by the RNC, the RNC sends a power configuration message carrying the adjusted power configuration information to the NodeB, so that the NodeB initializes and/or limits the downlink transmit power of the DPCH again according to the received power configuration information, thereby achieving a purpose of decreasing the downlink transmit power of the DPCH. The power configuration message may be reconfiguration signaling, establishment signaling or a newly added message.

If the monitoring and adjusting are implemented by the NodeB, the NodeB initializes and/or limits the downlink transmit power of the DPCH again according to the adjusted power configuration information, thereby achieving a purpose of decreasing the downlink transmit power of the DPCH.

205: Determine to increase or maintain the downlink transmit power of the DPCH.

Related description of the downlink transmit power of the DPCH is the same as that in step 202.

According to related description of the downlink transmit power of the DPCH in step 202, the downlink transmit power of the DPCH may be increased by increasing at least one piece of the following power configuration information, including: the maximum downlink transmit power value of the DPDCH, the initial downlink transmit power value of the DPDCH and the power offset value of the DPCCH.

206: Adjust power configuration information.

The power configuration information includes at least one of the maximum downlink transmit power value of the DPDCH, the initial downlink transmit power value of the DPDCH and the power offset of the DPCCH.

The adjusting the power configuration information includes increasing or maintaining the power configuration information.

It should be pointed out that, the adjusted power configuration information is consistent with the power configuration information at latest last time when downlink data is sent on the DPDCH.

If the latest last time is adjacent last time, the power configuration information is maintained unchanged.

At least one of the following three manners may be adopted to increase the power configuration information.

Manner 1: Increase the maximum downlink transmit power value of the DPDCH.

Manner 2: Increase the initial downlink transmit power value of the DPDCH.

Manner 3: Increase the power offset of the DPCCH.

Manner 1 is taken as an example for illustration as follows.

In the following four consecutive monitoring periods, in a first monitoring period, data is sent on the DPDCH, and when the data is sent, the maximum downlink transmit power value of the DPDCH is $P_{MAX1}$ (for example, −100; unit: 0.1 db). In two consecutive, second and third, monitoring periods, it is monitored that no downlink data is sent on the DPDCH, and in this case, the lowering of the maximum downlink transmit power value of the DPDCH is triggered twice, and the adjusted maximum downlink transmit power value of the DPDCH is $P_{MAX3}$ (for example, −160; unit: 0.1 dB). If in a fourth monitoring period, downlink data is sent on the DPDCH, the adjusted maximum downlink transmit power value $P_{MAX4}$ of the DPDCH is restored to the power configuration information at the latest last time when data is sent, that is, the maximum transmit power value $P_{MAX1}$ (for example, −100; unit: 0.1 dB) of the DPDCH in the first monitoring period.

If data is sent in the second and third monitoring periods, maximum downlink transmit power values of the DPDCH in the second, third, fourth monitoring periods are maintained unchanged and are all $P_{MAX1}$.

Manner 2 is taken as an example for illustration as follows.

In the following four consecutive monitoring periods, in a first monitoring period, data is sent on the DPDCH, and when the data is sent, the initial downlink transmit power value of the DPDCH is $P_{INIT1}$ (for example, −100; unit: 0.1 db). In two consecutive, second and third, monitoring periods, it is monitored that no downlink data is sent on the DPDCH, and in this case, the lowering of the initial downlink transmit power value of the DPDCH is triggered twice, and the adjusted initial downlink transmit power value of the DPDCH is $P_{INIT3}$ (for example, −160; unit: 0.1 dB). If in a fourth monitoring period, downlink data is sent on the DPDCH, the adjusted initial downlink transmit power value $P_{INIT4}$ of the DPDCH is restored to the power configuration information at the latest last time when data is sent, that is, the initial transmit power value $P_{INIT1}$ (for example, −100; unit: 0.1 dB) of the DPDCH in the first monitoring period.

If data is sent in the second and third monitoring periods, initial downlink transmit power values of the DPDCH in the second, third, fourth monitoring periods are maintained unchanged and are all $P_{INIT1}$.

207: Trigger the base station to increase or maintain the downlink transmit power of the DPCH according to the power configuration information.

Whether the adjusted power configuration information is consistent with current power configuration information is determined; if yes, the downlink transmit power of the DPCH needs to be maintained, and the procedure returns to step 201; and if not, the base station is triggered to increase the downlink transmit power of the DPCH according to the adjusted power configuration information.

The current power configuration information refers to power configuration information being used by the NodeB, and includes at least one of the maximum downlink transmit power value of the DPDCH, the initial downlink transmit power value of the DPDCH and the power offset of the DPCCH.

If the monitoring and adjusting are implemented by the RNC, the triggering the base station to increase the downlink transmit power of the DPCH according to the adjusted power configuration information refers to sending, by the RNC, a power configuration message carrying the adjusted power configuration information to the NodeB, so that the NodeB initializes and/or limits the downlink transmit power of the DPCH again according to the received adjusted power configuration information, thereby achieving a purpose of increasing the downlink transmit power of the DPCH. The power configuration message may be reconfiguration signaling, establishment signaling or a newly added message.

If the monitoring and adjusting are implemented by the NodeB, the triggering the base station to increase the downlink transmit power of the DPCH according to the adjusted power configuration information refers to initializing and/or limiting, by the NodeB, the downlink transmit power of the DPCH again according to the adjusted power configuration information, thereby achieving a purpose of increasing the downlink transmit power of the DPCH.

Figure 3:
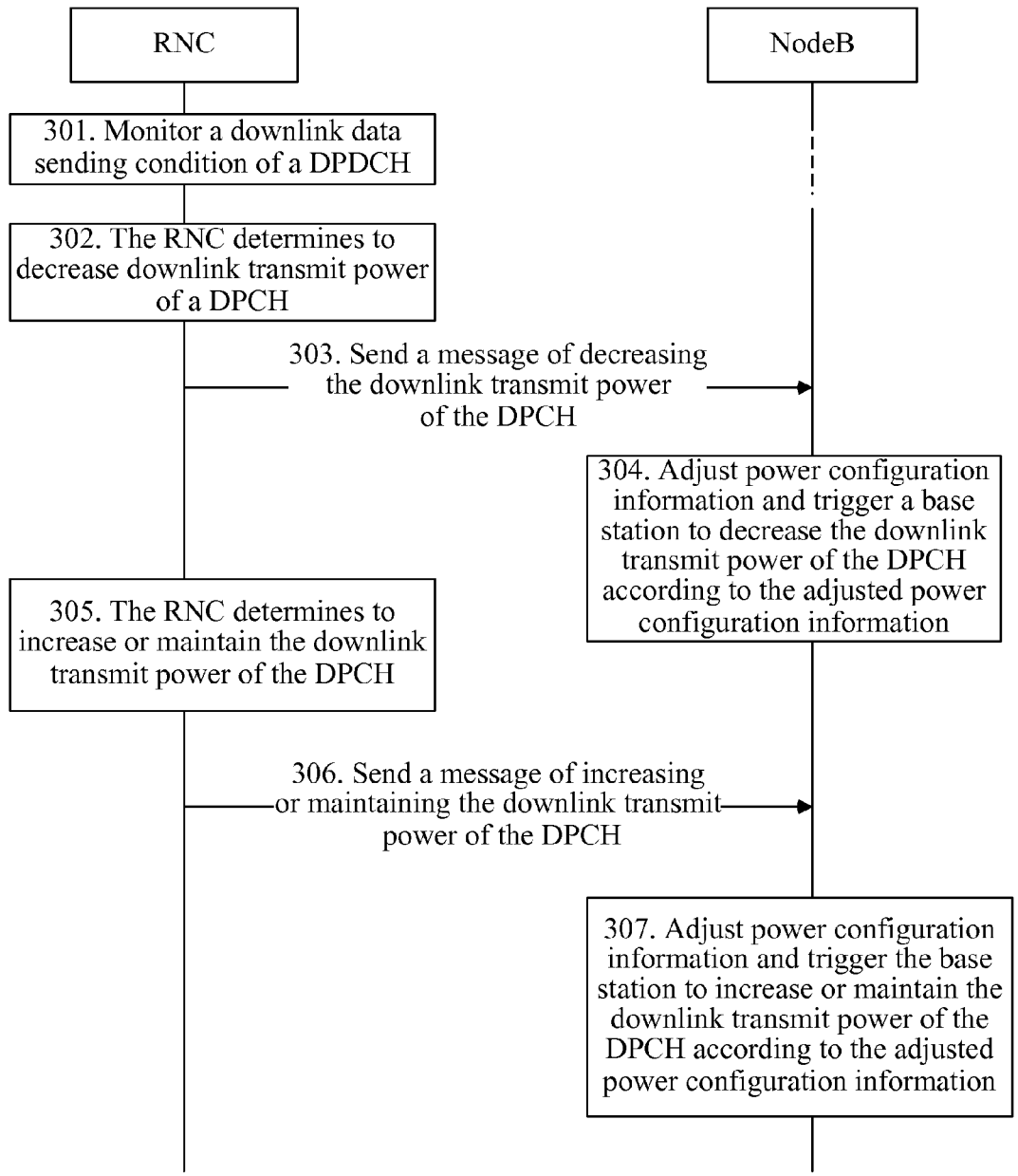
FIG. 3 is a schematic flow chart of an embodiment of another power control method according to the present invention.

Referring to FIG. 3, another embodiment of a power control method of the present invention may be described as follows.

301: An RNC monitors a downlink data sending condition of a DPDCH.

The DPDCH downlink data and a triggering mechanism of monitoring sending of the DPDCH downlink data are consistent with related description in step 201.

If the RNC monitors that no downlink data is sent on the DPDCH, step 302 is performed; and if the RNC monitors that downlink data is sent on the DPDCH, step 305 is performed.

302: The RNC determines to decrease downlink transmit power of a DPCH.

Related description of the downlink transmit power of the DPCH is the same as that in step 202.

303: The RNC sends a message of decreasing the downlink transmit power of the DPCH to a NodeB.

The message of decreasing the downlink transmit power of the DPCH may be a newly added message or delivered by being carried in an existing message.

304: Adjust power configuration information and trigger a base station to decrease the downlink transmit power of the DPCH according to the adjusted power configuration information.

The NodeB receives the message of decreasing the downlink transmit power of the DPCH and adjusts the power configuration information. Specific implementation of adjusting the power configuration information is the same as related description in step 203, and the triggering the base station to decrease the downlink transmit power of the DPCH according to the adjusted power configuration information is consistent with related description in step 204.

The NodeB initializes and/or limits the downlink transmit power of the DPCH again according to the adjusted power configuration information, thereby achieving a purpose of decreasing the downlink transmit power of the DPCH.

305: The RNC determines to increase or maintain the downlink transmit power of the DPCH.

Related description of the downlink transmit power of the DPCH is the same as that in step 205.

306: The RNC sends a message of increasing or maintaining the downlink transmit power of the DPCH to the NodeB.

The message of increasing or maintaining the downlink transmit power of the DPCH may be a newly added message or delivered by being carried in an existing message.

307: Adjust power configuration information and trigger the base station to increase or maintain the downlink transmit power of the DPCH according to the adjusted power configuration information.

For example, the adjusting the power configuration information is specifically described as follows.

The NodeB receives the message of increasing or maintaining the downlink transmit power of the DPCH, and adjusts the power configuration information according to an adjustment direction indicated by the message of increasing or maintaining the downlink transmit power of the DPCH.

Specific implementation of adjusting the power configuration information is the same as related description in step 206.

For example, the triggering the base station to increase or maintain the downlink transmit power of the DPCH according to the adjusted power configuration information is specifically described as follows.

The NodeB determines whether the adjusted power configuration information is consistent with current power configuration information; if yes, does not perform any operation; and if not, triggers the base station to increase the downlink transmit power of the DPCH according to the adjusted power configuration information.

The current power configuration information refers to power configuration information being used by the NodeB, and includes at least one of a maximum downlink transmit power value of the DPDCH, an initial downlink transmit power value of the DPDCH and a power offset of the DPCCH.

The triggering the base station to increase the downlink transmit power of the DPCH according to the adjusted power configuration information refers to initializing and/or limiting, by the base station, the downlink transmit power of the DPCH again according to the adjusted power configuration information, thereby achieving a purpose of increasing the downlink transmit power of the DPCH.

Figure 4:
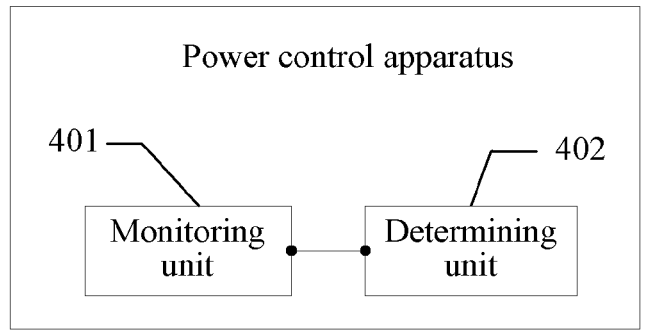
FIG. 4 is a schematic structural diagram of an embodiment of a power control apparatus according to the present invention.

Referring to FIG. 4, FIG. 4 is a schematic structural diagram of a power control apparatus according to an embodiment of the present invention. The power control apparatus may be a base station or a part of a base station, may also be a base station controller or a part of a base station controller, and may be implemented through software or hardware, for example, a circuit.

In this embodiment, the power control apparatus includes a monitoring unit 401 and a determining unit 402.

The monitoring unit 401 is configured to monitor a downlink data sending condition of a DPDCH.

The determining unit 402 is configured to, when the monitoring unit 401 monitors that no downlink data is sent on the DPDCH, determine to decrease downlink transmit power of a DPCH, and when the monitoring unit 401 monitors that downlink data is sent on the DPDCH, determine to increase or maintain the downlink transmit power of the DPCH.

Figure 5:
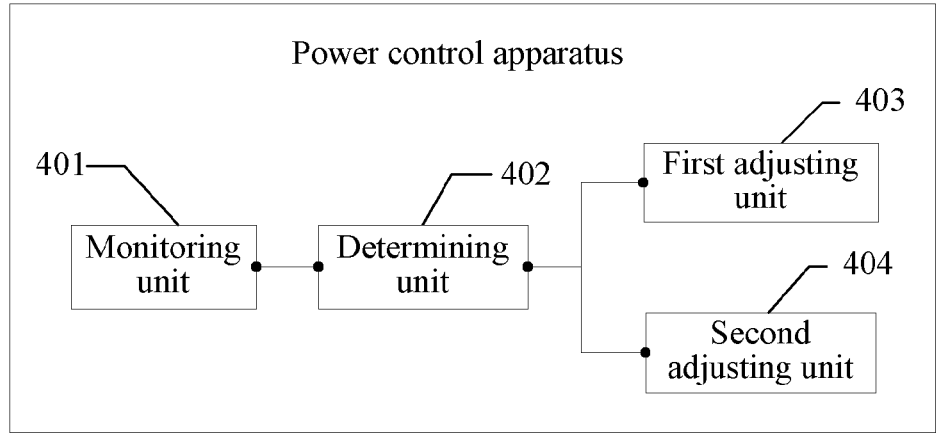
FIG. 5 is a schematic structural diagram of an embodiment of another power control apparatus according to the present invention.

Optionally, as shown in FIG. 5, the power control apparatus further includes: a first adjusting unit 403 and a second adjusting unit 404.

The first adjusting unit 403 is configured to adjust power configuration information when the determining unit 402 determines to decrease the downlink transmit power of the DPCH.

The second adjusting unit 404 is configured to adjust the power configuration information when the determining unit 402 determines to increase or maintain the downlink transmit power of the DPCH.

Figure 6:
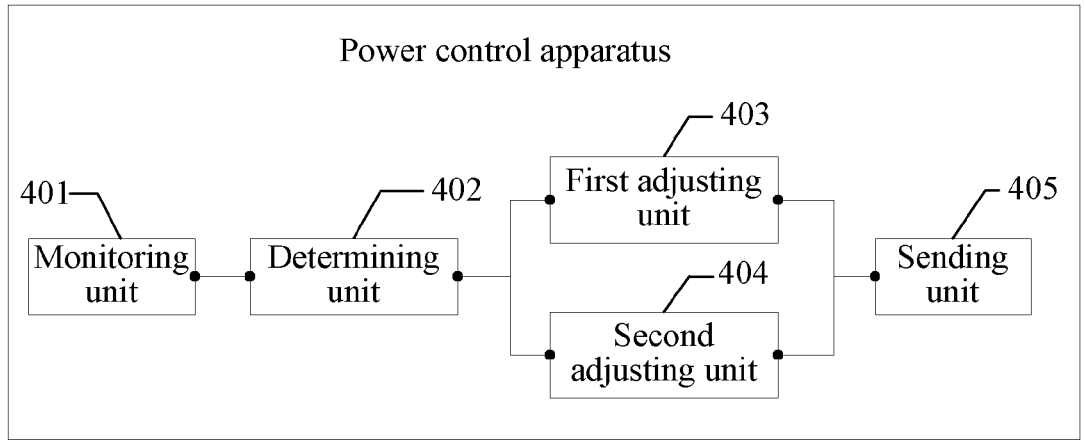
FIG. 6 is a schematic structural diagram of an embodiment of another power control apparatus according to the present invention.

Optionally, as shown in FIG. 6, when the power control apparatus is a base station controller or a part of a base station controller, the apparatus further includes a sending unit 405.

The sending unit 405 is configured to send the adjusted power configuration information in the first adjusting unit 403 and the second adjusting unit 404 to the base station.

Figure 7:
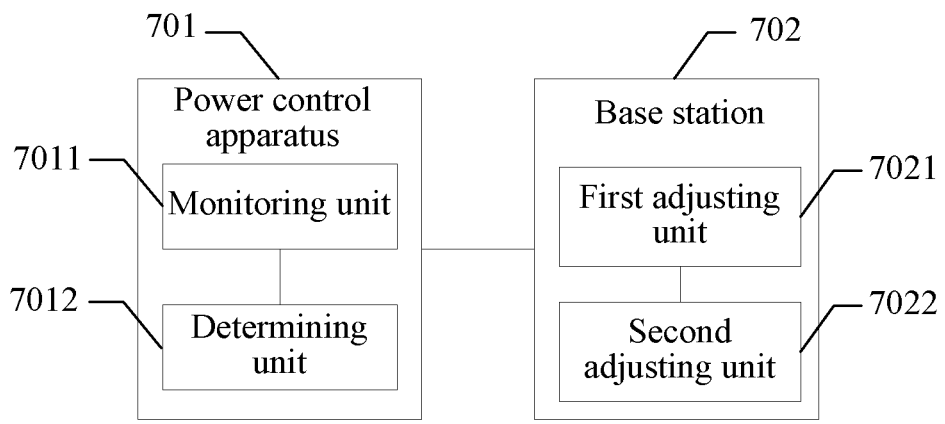
FIG. 7 is a schematic structural diagram of an embodiment of a power control system according to the present invention.

As shown in FIG. 7, a power control system in this embodiment includes a power control apparatus 701 and a base station 702.

The power control apparatus 701 is configured to: monitor a downlink data sending condition of a DPDCH; when no downlink data is sent on the DPDCH, determine to decrease downlink transmit power of a DPCH; and when downlink data is sent on the DPDCH, determine to increase or maintain the downlink transmit power of the DPCH.

The power control apparatus 701 includes: a monitoring unit 7011 and a determining unit 7012.

The monitoring unit 7011 is configured to monitor the downlink data sending condition of the DPDCH.

The determining unit 7012 is configured to, when no downlink data is sent on the DPDCH, determine to decrease the downlink transmit power of the DPCH, and when downlink data is sent on the DPDCH, determine to increase or maintain the downlink transmit power of the DPCH.

The base station 702 is configured to adjust power configuration information according to an adjustment direction determined by the power control apparatus, and adjust the downlink transmit power of the DPCH according to the adjusted power configuration information.

The adjustment direction refers to decreasing the downlink transmit power of the DPCH or increasing or maintaining the downlink transmit power of the DPCH.

The base station 702 includes: a first adjusting unit 7021 and a second adjusting unit 7022.

The first adjusting unit 7021 is configured to adjust the power configuration information when the determining unit 7012 determines to decrease the downlink transmit power of the DPCH.

The second adjusting unit 7022 is configured to adjust the power configuration information when the determining unit 7012 determines to increase the downlink transmit power of the DPCH.

Figure 8:
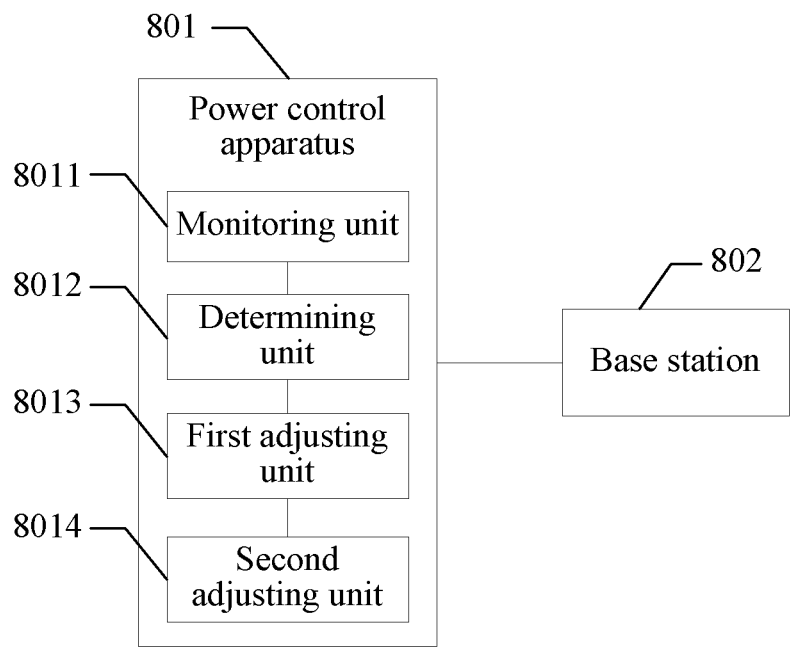
FIG. 8 is a schematic structural diagram of an embodiment of another power control system according to the present invention.

As shown in FIG. 8, another power control system in this embodiment includes a power control apparatus 801 and a base station 802.

The power control apparatus 801 is configured to: monitor a downlink data sending condition of a DPDCH; when no downlink data is sent on the DPDCH, determine to decrease downlink transmit power of a DPCH; when downlink data is sent on the DPDCH, determine to increase or maintain the downlink transmit power of the DPCH; and adjust power configuration information.

The power control apparatus 801 includes: a monitoring unit 8011, a determining unit 8012, a first adjusting unit 8013 and a second adjusting unit 8014.

The monitoring unit 8011 is configured to monitor the downlink data sending condition of the DPDCH.

The determining unit 8012 is configured to, when no downlink data is sent on the DPDCH, determine to decrease the downlink transmit power of the DPCH, and when downlink data is sent on the DPDCH, determine to increase or maintain the downlink transmit power of the DPCH.

The first adjusting unit 8013 is configured to adjust the power configuration information when the determining unit determines to decrease the downlink transmit power of the DPCH.

The second adjusting unit 8014 is configured to adjust the power configuration information when the determining unit determines to increase the downlink transmit power of the DPCH.

The base station 802 is configured to adjust the downlink transmit power of the DPCH according to the adjusted power configuration information.

Persons skilled in the art may clearly understood that, for the purpose of convenient and brief description, only dividing of the foregoing functional modules is illustrated. In an actual application, the foregoing functions may be allocated to different functional modules for implementation as required, that is, an internal structure of the apparatus is divided into different functional modules to complete all or part of functions described in the foregoing. For specific working processes of the foregoing system, apparatus and unit, reference may be made to corresponding processes in the foregoing method embodiments, and the details are not repeatedly described here.

In several embodiments provided in the present application, it should be understood that the disclosed system, apparatus, and method may be implemented in other manners. For example, the described apparatus embodiments are merely exemplary. For example, dividing of the module or unit is merely a kind of logical function dividing, and there may be other dividing manners in actual implementation. For example, multiple units or components may be combined or integrated into another system, or some features may be ignored or not performed. Furthermore, the shown or discussed mutual coupling or direct coupling or communication connection may be accomplished through some interfaces, and indirect coupling or communication connection between apparatuses or units may be electrical, mechanical, or in other forms.

Units described as separate components may be or may not be physically separated. Components shown as units may be or may not be physical units, that is, may be disposed in one place or distributed to a plurality of network units. Part or all of the units may be selected to achieve an objective of the solution of the embodiment according to actual demands.

In addition, various functional units according to the embodiments of the present invention may be integrated in one processing unit, various units may also exist separately and physically, and two or more than two units may also be integrated into one unit. The integrated unit may be implemented in a form of hardware, and may also be implemented in a form of a software functional unit.

When the integrated unit is implemented in the form of the software functional unit and sold or used as a separate product, the integrated unit may be stored in a computer readable storage medium. Based on such understanding, the technical solutions of the present invention or the part that makes contributions to the prior art or all or a part of the technical solutions may be substantially embodied in a form of a software product. The computer software product is stored in a storage medium, and includes several instructions to instruct a computer device (which may be a personal computer, a server, or a network device, or the like) or a processor (processor) to perform all or a part of steps of the methods described in the embodiments of the present invention. The foregoing storage medium includes various media capable of storing program codes, such as, a USB flash disk, a mobile hard disk, a read-only memory (ROM, Read-Only Memory), a random access memory (RAM, Random Access Memory), a magnetic disk or an optical disk.

The foregoing described embodiments are merely provided for describing the technical solutions of the present invention, but not intended to limit the present invention. Although the present invention is described in detail with reference to the foregoing embodiments, persons of ordinary skill in the art should understood that, they may still make modifications to the technical solutions recorded in the foregoing embodiments, or equivalent replacements to part of the technical features in the technical solutions; however, these modifications or replacements do not make the essence of the corresponding technical solutions depart from the spirit and scope of the technical solutions of the embodiments of the present invention.

What is claimed is:

1. A power control method, comprising:
    monitoring, by a processor, a downlink data sending condition of a dedicated physical data channel (DPDCH) of a dedicated physical channel (DPCH); and
    if no downlink data is sent on the DPDCH, determining to decrease downlink transmit power of the DPCH, and adjusting power configuration information and triggering a base station to decrease the downlink transmit power of the DPCH according to the adjusted power configuration information, or
    if downlink data is sent on the DPDCH, determining to increase or maintain the downlink transmit power of the DPCH, and adjusting the power configuration information and triggering a base station to increase or maintain the downlink transmit power of the DPCH according to the adjusted power configuration information;
    wherein the DPCH comprises the DPDCH and a dedicated physical control channel (DPCCH), and
    the power configuration information comprises a maximum downlink transmit power value of the DPDCH or an initial downlink transmit power value of the DPDCH.

2. The method according to claim 1, wherein the adjusting the power configuration information comprises:
    decreasing a maximum downlink transmit power value of the DPDCH; or
    decreasing an initial downlink transmit power value of the DPDCH.

3. The method according to claim 1, wherein the adjusting the power configuration information comprises:
    increasing a maximum downlink transmit power value of the DPDCH; or
    increasing an initial downlink transmit power value of the DPDCH; or
    increasing a power offset of the DPCCH.

4. A power control apparatus, comprising:
    a monitoring unit, configured to monitor a downlink data sending condition of a dedicated physical data channel (DPDCH) of a dedicated physical channel (DPCH);
    a determining unit, configured to, when the monitoring unit monitors that no downlink data is sent on the DPDCH, determine to decrease downlink transmit power of the DPCH, and when the monitoring unit monitors that downlink data is sent on the DPDCH, determine to increase or maintain the downlink transmit power of the DPCH;
    a first adjusting unit, configured to adjust power configuration information and trigger a base station to decrease the downlink transmit power of the DPCH according to the adjusted power configuration information, when the determining unit determines to decrease the downlink transmit power of the DPCH; and
    a second adjusting unit, configured to adjust the power configuration information and trigger a base station to increase or maintain the downlink transmit power of the DPCH according to the adjusted power configuration information, when the determining unit determines to increase the downlink transmit power of the DPCH
    wherein the DPCH comprises the DPDCH and a dedicated physical control channel (DPCCH), and
    the power configuration information comprises a maximum downlink transmit power value of the DPDCH or an initial downlink transmit power value of the DPDCH.

5. A power control system, comprising:
    a power control apparatus, configured to: monitor a downlink data sending condition of a dedicated physical data channel (DPDCH) of a dedicated physical channel (DPCH); and
    a base station, configured to adjust power configuration information according to an adjustment direction determined by the power control apparatus, and adjust the downlink transmit power of the DPCH according to the adjusted power configuration information;
    wherein the DPCH comprises the DPDCH and a dedicated physical control channel (DPCCH),
    the power configuration information comprises a maximum downlink transmit power value of the DPDCH or an initial downlink transmit power value of the DPDCH,
    wherein the power control apparatus comprises a determining unit, configured to, when no downlink data is sent on the DPDCH, determine to decrease downlink transmit power of the DPCH, and when downlink data is sent on the DPDCH, determine to increase or maintain the downlink transmit power of the DPCH, and
    wherein the base station comprises:
        a first adjusting unit, configured to adjust the power configuration information and to decrease the downlink transmit power of the DPCH according to the adjusted power configuration information, when the power control apparatus determines to decrease the downlink transmit power of the DPCH; and
        a second adjusting unit, configured to adjust the power configuration information and to increase or maintain the downlink transmit power of the DPCH according to the adjusted power configuration information, when the power control apparatus determines to increase the downlink transmit power of the DPCH.

6. The power control system according to claim 5, wherein the power control apparatus further comprises:
    a monitoring unit, configured to monitor the downlink data sending condition of the DPDCH.

7. A power control system, comprising:
    a power control apparatus, configured to: monitor a downlink data sending condition of a dedicated physical data channel (DPDCH) of a dedicated physical channel (DPCH); and a base station, configured to adjust the downlink transmit power of the DPCH according to an adjusted power configuration information in the power control apparatus;

wherein the DPCH comprises the DPDCH and a dedicated physical control channel (DPCCH), the power configuration information comprises a maximum downlink transmit power value of the DPDCH or an initial downlink transmit power value of the DPDCH, and wherein the power control apparatus comprises:
- a determining unit, configured to, when no downlink data is sent on the DPDCH, determine to decrease downlink transmit power of the DPCH, and when downlink data is sent on the DPDCH, determine to increase or maintain the downlink transmit power of the DPCH;
- a first adjusting unit, configured to adjust the power configuration information when the determining unit determines to decrease the downlink transmit power of the DPCH; and
- a second adjusting unit, configured to adjust the power configuration information when the determining unit determines to increase the downlink transmit power of the DPCH.

8. The power control system according to claim 7, wherein the power control apparatus further comprises:
a monitoring unit, configured to monitor the downlink data sending condition of the DPDCH.

9. A power control system, comprising:

a power control apparatus configured to monitor a downlink data sending condition of a dedicated physical data channel (DPDCH) of a dedicated physical channel (DPCH); and configured to, when the power control apparatus monitors that no downlink data is sent on the DPDCH, determine to decrease downlink transmit power of the DPCH and to adjust power configuration information and trigger a base station to decrease the downlink transmit power of the DPCH according to the adjusted power configuration information, and when the power control apparatus monitors that downlink data is sent on the DPDCH, determine to increase or maintain the downlink transmit power of the DPCH and to adjust the power configuration information and trigger a base station to increase or maintain the downlink transmit power of the DPCH according to the adjusted power configuration information, wherein the DPCH comprises the DPDCH and a dedicated physical control channel (DPCCH), and the power configuration information comprises a maximum downlink transmit power value of the DPDCH or an initial downlink transmit power value of the DPDCH.

* * * * *